Feb. 14, 1939. D. ULREY 2,147,472

HIGH CURRENT IMPULSE DEVICE

Filed Aug. 20, 1937

WITNESSES:
E. A. McCloskey
Hymen Diamond

INVENTOR
Doyton Ulrey.
BY F. W. Lyle.
ATTORNEY

Patented Feb. 14, 1939

2,147,472

UNITED STATES PATENT OFFICE 2,147,472

HIGH CURRENT IMPULSE DEVICE

Dayton Ulrey, Wilkinsburg, Pa., assignor to Westinghouse Electric & Manufacturing Company, East Pittsburgh, Pa., a corporation of Pennsylvania Application August 20, 1937, Serial No. 160,109

20 Claims. (Cl. 250—27)

My invention relates to electric discharge apparatus, and it has particular relation to control apparatus for electric discharge devices.

It is an object of my invention to provide apparatus for producing a series of periodic current impulses of short duration and of substantial magnitude.

Another object of my invention is to provide apparatus for controlling a discharge device having a control electrode of the immersion type in such manner that the discharge device shall be rendered conductive periodically for a short interval of time.

A further object of my invention is to provide a system particularly adapted to control the output of a discharge device having a control electrode of the ignition or the immersion type.

More specifically stated, it is an object of my invention to provide apparatus that shall operate with high efficiency and with as little power loss as possible to produce a series of periodic current impulses of short duration.

According to one modification of my invention, a discharge device having a control electrode and a plurality of principal electrodes is supplied with control potential and with principal potential through capacitors that are connected to be charged from a periodic source. The capacitor through which control potential is supplied is connected to the control electrode of the discharge device through an auxiliary discharge device of the grid controlled type. The capacitors are charged during a portion of each cycle of the source. During the remaining portions of the cycles, the auxiliary discharge device is energized, thus permitting the capacitor in the control circuit to discharge and to energize the main discharge device. The main discharge device remains energized for the interval of time required by the capacitor through which the principal potential is supplied to discharge. Specifically, my invention is provided for the purpose of supplying a current of the order of several thousand amperes at a relatively low potential at a frequency of the order of sixty times per second. The current is to persist for a time interval of the order of $\frac{1}{600}$ second. Accordingly the periodic source may have a frequency of 60 cycles, the charging circuits for both capacitors and the magnitude of the capacitors must be such that they are sufficiently charged to operate the discharge device in less than $\frac{1}{60}$ second and the main discharge device must have sufficiently high conductivity when energized to discharge the capacitor through which the principal potential is supplied in $\frac{1}{600}$ second and in addition must be capable of dissipating the power developed.

According to another modification of my invention, the capacitor whereby the principal potential is supplied to the main discharge device is not used. Instead, the main discharge device is supplied directly from the source but is extinguished at the proper instant by an auxiliary discharge device which is ignited when current is transmitted through the main discharge device. Since the auxiliary discharge device draws considerable current, it is desirable that after performing its function it remain energized for as short an interval of time as possible. I, therefore, provide for the energization of the main discharge device at such points in the successive cycles of the source that during each operation the auxiliary discharge device remains energized for considerably less than a quarter cycle of the source and during the interval during which the potential of the source is decreasing rapidly.

In accordance with the preferred practice of my invention, the main discharge device has a principal electrode of the mercury pool type and a control electrode of the immersion type. The expression "electrode (or cathode) of the mercury pool type" shall be taken herein to mean not only an electrode of liquid mercury, but an electrode composed of any other substance which has electronic discharge properties similar to that of mercury. For example, electrodes of lead, cadmium, zinc or alloys of these or other metals are contemplated by me to fall within the scope of the above-defined expression.

In referring herein to "a control electrode of the immersion type", I mean an electrode which is composed of a resistant material and which dips into the mercury electrode. Within the scope of this expression fall electrodes of boron carbide, silicon carbide, powdered carbon formed into a solid rod with a binder of one type or another and other similar materials.

It is to be noted, moreover, that my invention is to be regarded as in no way limited to apparatus incorporating a discharge device having a control electrode of the immersion type. For example, my invention may be practiced with a discharge device having a cathode of the mercury pool type with which a control electrode of any general ignition type cooperates. While the electrode of the immersion type is one form of an electrode of the ignition type, there are a number of other forms characterized by the distinction the starting electrode is out of contact with the mercury pool electrode. The ignition electrode may, for example, be separated from the mercury pool by a short gap, and the main discharge may be started by first igniting an arc in the gap. The ignition electrode may also consist of a collar mounted externally about the discharge vessel in the region of the mercury pool. Finally, where currents of smaller magnitude than that mentioned hereinabove are desired, a grid-controlled discharge device of the gas-filled hot-cathode type may be utilized, and where very small currents are desired, a high vacuum grid-controlled discharge device may be used. Of course, the auxiliary discharge devices may be of the various types and structures mentioned hereinabove.

The novel features that I consider characteristic of my invention are set forth with particularity in the appended claims. The invention itself, however, both as to its organization and its method of operation, together with additional objects and advantages thereof will best be understood from the following description of specific embodiments when read in connection with the accompanying drawing, in which:

Figure 1:
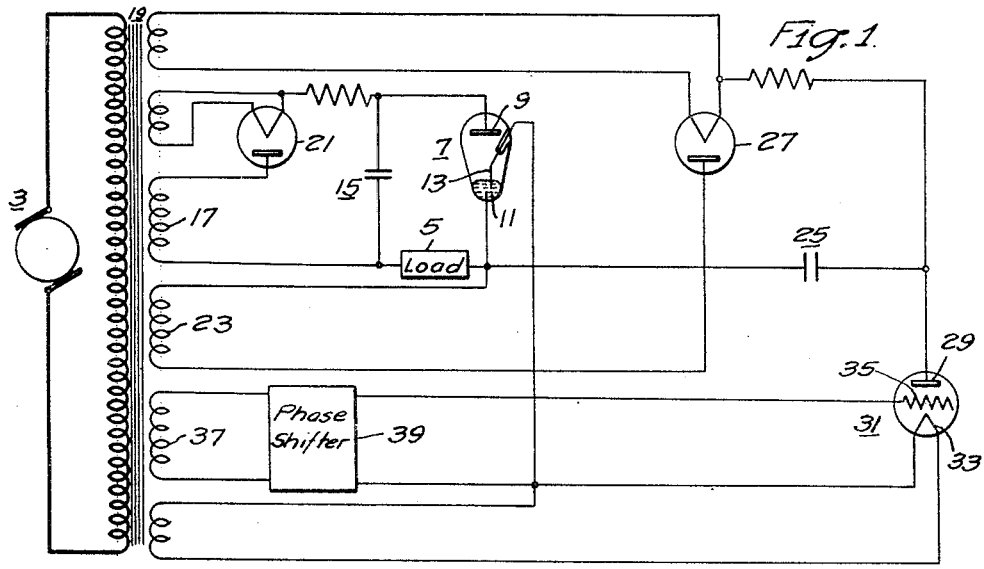
Figure 1 is a diagrammatic view showing an embodiment of my invention.

The apparatus shown in Fig. 1 comprises a source 3 of alternating current which, if the power to be supplied is to have the properties mentioned above, may be of the ordinary commercial 60-cycle type. A load 5 is to be supplied periodically with current impulses of short duration and to control the supply of power to the load an electric discharge device 7 is provided. The discharge device 7 has an anode 9, a cathode 11 of the mercury pool type and a control electrode 13 of the immersion type. Between the principal electrodes 9 and 11 of the discharge device a capacitor 15 is connected. One plate of the capacitor is directly connected to the anode 9 and the other plate is connected to the cathode 11 through the load 5. The capacitor 15 is charged, from a secondary section 17 of a transformer 19 supplied from the source 3, through a rectifier 21, which is shown specifically as being of the hot-cathode type but which may be of any other type, as, for example, a dry rectifier of the copper-oxide type.

Control potential is supplied to the discharge device 7 from another secondary section 23 of the transformer 19 through a second capacitor 25 which is in turn charged from the latter section through a second rectifier 27. One plate of the latter capacitor 25 is connected directly to the cathode 11 of the discharge device 3; the other plate is connected to the anode 29 of an auxiliary discharge device 31. The cathode 33 of the auxiliary device is connected directly to the control electrode 13 of the main discharge device 7.

The auxiliary discharge device 31 is preferably of the hot-cathode gaseous type and may, for example, be a "Thyratron" tube. It is provided with a control electrode 35 and a potential is supplied between the control electrode and the cathode 33 from another secondary section 37 through a suitable phase-shifting arrangement 39.

The capacitors 15 and 25 are charged through the rectifiers 21 and 27 during alternate half cycles of the source 3, the capacitor 15 in the principal circuit of the main discharge device 7 being so charged that the plate connected to the anode 9 is positive and the other plate is negative and the capacitor 25 connected in the control circuit being so charged that the plate connected in the anode 29 of the auxiliary discharge device 31 is positive and the other plate is negative. During the intervening alternate half cycles of the source 3 and at points in the half cycles which are selected by the phase-shifting arrangement 39, the control potential supplied to the auxiliary discharge device 31 attains such a magnitude that the latter is rendered conductive. Current is then transmitted from the capacitor 25 through the anode 29 and the cathode 33 of the auxiliary discharge device 31, and through the control electrode 13 and the cathode 11 of the main discharge device 7. The main discharge device is therefore energized and the capacitor 15 in its principal circuit discharges through it and through the load. The discharge device 7 and the load 5 are of such character that the capacitor 15 is completely discharged in the interval of time required. In the example given, this interval is of the order of 1/600 second.

In practicing my invention with the embodiment shown in Fig. 1, I prefer to use a Westinghouse KU-671 "Ignitron" tube for the main discharge device 7 and the Westinghouse KU-628 "Thyratron" tube for the auxiliary discharge device. The rectifiers may be Westinghouse 866-A tubes and the output potential of each of the secondary sections through which the capacitors are charged may be 110 volts.

Figure 2:
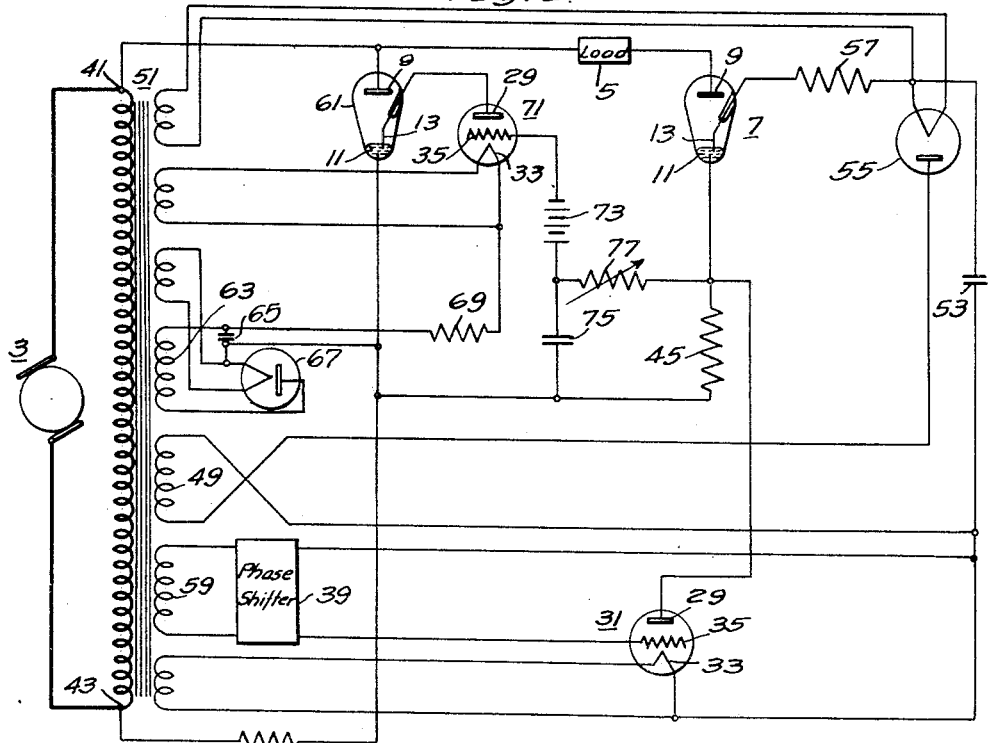
Fig. 2 is a diagrammatic view showing a modification of my invention.

In the apparatus shown in Fig. 2, the load 5 is supplied from a discharge device 7 of the same type as in Fig. 1. However, the anode 9 of the discharge device is now connected to the upper terminal 41 of the source 3 through the load and the cathode 11 is connected to the lower terminal 43 of the source through a pair of current limiting resistors 45 and 47. Control potential is supplied to the main discharge device 7, in the same manner as in the apparatus shown in Fig. 1, from a secondary section 49 of a transformer 51 supplied from the source 3 through a capacitor 53 connected in series with a rectifier 55 across the section. One plate of the capacitor 53 is connected to the control electrode 13 of the main discharge device 7 through a small resistor 57 which may be of the order of two ohms; the other plate of the capacitor is connected directly to the cathode 33 of an auxiliary discharge device 31 similar to that utilized in the Fig. 1 system. The anode 29 of the auxiliary discharge device 31 is connected at the junction point of the cathode 11 of the main discharge device 7 and the current limiting resistor 45 connected directly thereto. Control potential is supplied to the auxiliary discharge device 31 from another secondary section 59 of the transformer 51 through a phase-shifting arrangement 39 similar to that used in the apparatus shown in Fig. 1.

During each of a series of alternate half cycles of the source 3, the capacitor 53 is charged so that the plate connected to the control electrode 13 is positive and the other plate is negative. During each of the remaining half cycles of the source, the auxiliary discharge device 31 is energized by the potential supplied through the phase shifter and current is transmitted from the capacitor 53 through the control electrode 13 of the main discharge device 7, its cathode 11, the anode-cathode circuit of the auxiliary discharge device 31 to the capacitor. In the preferred practice of my invention, the phase shifter 39 is so set that the control potential supplied to the auxiliary discharge device 31 is of sufficient magnitude to energize the device at points leading the maximum points in the half cycles of the source by an angle of the order of from 5 to 10 electrical degrees. The main discharge device 7 is thus energized substantially at the point of maximum potential and would supply current during the remainder of the half cycle if not extinguished.

To extinguish the main discharge device 7, I provide a second auxiliary discharge device 61. The latter is of the type having a mercury pool electrode 11 and a control electrode 13 of the immersion type and its current carrying capacity is substantially of the same order as that of the main discharge device 7. The cathode 11 of the second auxiliary discharge device 61 is connected to the junction point of the current-limiting resistors 45 and 47 and the anode 9 is connected directly to the same terminal 41 of the source 3 as the anode 9 of the main discharge device 7.

Control potential is supplied to the second auxiliary discharge device 61 from another secondary section 63 of the transformer 51 through a capacitor 65 which is, in turn, charged from the section through a rectifier 67. One plate of the capacitor 65 is connected directly to the cathode 11 of the second auxiliary discharge device 61; the other plate is connected through a resistor 69 of small magnitude to the cathode 33 of a third auxiliary discharge device 71 which may be similar to the first auxiliary discharge device 31. The anode 29 of the latter discharge device 71 is connected to the control electrode 13 of the second auxiliary discharge device 61. The control electrode 35 of the third auxiliary discharge device 71 is connected to the cathode 33 thereof through a suitable biasing battery 73, a third capacitor 75 and the capacitor 65 in the control circuit of the second auxiliary discharge device 61 and is maintained deenergized as long as the main discharge device 7 is deenergized. However, one plate of the third capacitor 75 is connected to a junction point of the cathode 11 of the main discharge device 7 and the current limiting resistor 45 through a timing resistor 77 of variable magnitude; the other plate of the capacitor 75 is connected to the junction point of the two current-limiting resistors 45 and 47.

When the main discharge device 7, having been energized by the discharge of the first capacitor 53, passes current, a drop in potential is produced across the current-limiting resistor 45 connected directly thereto and the third capacitor 75 is charged with its place connected to the biasing battery 73 positive and the other plate negative. The rate of charging may be determined by the timing resistor 77 in the circuit of the capacitor and may be adjusted so that the third auxiliary discharge device 71 is supplied with energizing potential from the third capacitor 75 when the main discharge device 7 has passed current through the load 5 for the desired time interval. When the third auxiliary discharge device 71 is energized, current is supplied from the capacitor 65 in its principal circuit through the control electrode 13 of the second auxiliary discharge device 61 and the latter is energized. Since the latter device 61 passes substantial current, the drop in the potential across the main discharge device 7 and the current-limiting resistor 45 in series therewith is so reduced that the device 7 is immediately deenergized. The second auxiliary discharge device 61 now continues to pass current until it is extinguished at the end of the half cycle. The same procedure is repeated during each half cycle of the source that intervenes between the half cycles during which the capacitors 53 and 65 are charged.

In the preferred practice of the modification of my invention as it is shown in Fig. 2, the discharge devices 7 and 61 may be Westinghouse KU–671 "Ignitron" tubes, the rectifiers 55 and 67 may be Westinghouse 866–A tubes, the devices 31 and 71 may be Westinghouse KU–628 "Thyratron" tubes, the resistors 57 and 69 may have a magnitude of the order of 2 ohms, the capacitors 53 and 65 may be of the order of 5 microfarads, the capacitor 75 may be of the order of .1 microfarad, the resistor 77 may have a magnitude of the order of 50,000 to 100,000 ohms, the potential of the battery 73 may be 20 to 45 volts, the potential of the source may be 220 volts and the potential output of the secondary sections 49 and 63 may be 110 volts.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a main electric discharge device having a plurality of principal electrodes and a control electrode, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portion of the periods and to substantially increase the conductivity of said auxiliary device during the remaining portions of said periods thereby to render said main discharge device conductive during the said remaining portions, said main discharge device on being rendered conductive discharging said second capacitor between said control electrode and said one principal electrode thereof.

2. In combination, a main electric discharge device having a plurality of principal electrodes and a control electrode and a gaseous medium, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portions of the periods and to substantially increase the conductivity of said auxiliary device during the remaining portions of said periods thereby to render said main discharge device conductive during the said remaining portions, said main discharge device on being rendered conductive discharging said second capacitor between said control electrode and said one principal electrode thereof.

3. In combination, a main electric discharge device having a plurality of principal electrodes and a control electrode of the ignition type and a gaseous medium, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portions of the periods and to substantially increase the conductivity of said auxiliary device during the remaining portions of said periods thereby to render said main discharge device conductive during the said remaining portions.

4. In combination, a main electric discharge device having a plurality of principal electrodes one of which is of the mercury pool type and a control electrode of the immersion type, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portions of the periods and to substantially increase the conductivity of said auxiliary device during the remaining portions of said periods thereby to render said main discharge device conductive during the said remaining portions.

5. In combination, a main electric discharge device having a plurality of principal electrodes and a control electrode and a gaseous medium, a first capacitor connected between said principal electrodes, an auxiliary discharge device having a plurality of principal electrodes and a control electrode, and a gaseous medium; a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portions of the periods and to substantially increase the conductivity of said auxiliary device during the remaining portions of said periods thereby to render said main discharge device conductive during the said remaining portions, said main discharge device on being rendered conductive discharging said second capacitor between said control electrode and said one principal electrode thereof.

6. In combination, a main electric discharge device having a plurality of principal electrodes one of which is of the mercury pool type and a control electrode of the immersion type, a first capacitor connected between said principal electrodes, an auxiliary discharge device having a plurality of principal electrodes and a control electrode and a gaseous medium, a second capacitor connected between the control electrode and a principal electrode of the main discharge device through the principal electrodes of said auxiliary discharge device, a periodic source of electrical energy, means for charging said capacitors from said source during a portion of each of its periods and means for impressing potentials between the control electrode and a principal electrode of said auxiliary discharge device to maintain the conductivity of said auxiliary discharge device small during said last-mentioned portion of the periods and to substantially increase the conductivity of said auxiliary device during the remaining portions of said periods thereby to render said main discharge device conductive during the said remaining portions.

7. In combination, a main electric discharge device having a plurality of principal electrodes and a control electrode, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, an alternating source of electrical energy, means for charging said capacitors from said source during alternate half periods of said source and means for impressing potentials between the control electrode and a principal electrode of said auxiliary discharge device to maintain the conductivity of said auxiliary discharge device small during said alternate half periods and to substantially increase the conductivity of said auxiliary device during the remaining half periods thereby to render said main discharge device conductive during the said remaining half periods, said main discharge device on being rendered conductive discharging said second capacitor between said control electrode and said one principal electrode thereof.

8. In combination, a main electric discharge device having a plurality of principal electrodes one of which is of the mercury pool type and a control electrode of the immersion type, a first capacitor connected between said principal electrodes, an auxiliary discharge device having a plurality of principal electrodes and a control electrode, a second capacitor connected between the control electrode and a principal electrode of the main discharge device through the principal electrodes of said auxiliary discharge device, an alternating source of electrical energy, means for charging said capacitors from said source during alternate half periods of said source and means for impressing potentials between the control electrode and a principal electrode of said auxiliary discharge device to maintain the conductivity of said auxiliary discharge device small during said alternate half periods and to substantially increase the conductivity of said auxiliary device during the remaining half periods thereby to render said main discharge device conductive during the said remaining half periods.

9. In combination, a main electric discharge device having a plurality of principal electrodes one of which is of the mercury pool type and a control electrode of the immersion type, a first capacitor connected between said principal electrodes, an auxiliary discharge device having a plurality of principal electrodes and a control electrode and a gaseous medium, a second capacitor connected between the control electrode and a principal electrode of the main discharge device through the principal electrodes of said auxiliary discharge device, an alternating source of electrical energy, means for charging said capacitors from said source during alternate half periods of said source and means for impressing potentials between the control electrode and a principal electrode of said auxiliary discharge device to maintain the conductivity of said auxiliary discharge device small during said alternate half periods and to substantially increase the conductivity of said auxiliary device during the remaining half periods thereby to render said main discharge device conductive during the said remaining half periods.

10. Apparatus according to claim 1 characterized by charging means for the capacitors which includes valve means to prevent the capacitors from discharging through the paths through which they are charged.

11. Apparatus according to claim 6 characterized by charging means for the capacitors which includes valve means to prevent the capacitors from discharging through the paths through which they are charged.

12. Apparatus according to claim 9 characterized by charging means for the capacitors which includes valve means to prevent the capacitors from discharging through the paths through which they are charged.

13. In combination, a main electric discharge device having a plurality of principal electrodes and a control electrode, a periodic source of electrical potential, connections for impressing a potential between the principal electrodes of said discharge device, a capacitor, means for charging said capacitor during a portion of each period of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining portions of each of the periods of said source thereby to render said main discharge device conductive said main discharge device on being rendered conductive discharging said capacitor between said control electrode and said one principal electrode thereof, and means for rendering said main discharge device non-conductive a short time compared to a period of said source, after it has been rendered conductive.

14. In combination, a main electric discharge device having a plurality of principal electrodes and a control electrode, a first capacitor connected between said principal electrodes, an auxiliary discharge device having a plurality of principal electrodes, a second capacitor connected between the control electrode and a principal electrode of the main discharge device through the principal electrodes of said auxiliary discharge device, a periodic source of electrical energy, means for charging said capacitors from said source during a portion of such of its periods and means for maintaining the conductivity of said auxiliary discharge device small during said last-mentioned portion of the periods and for substantially increasing the conductivity of said auxiliary device during the remaining portions of said periods thereby to render said main discharge device conductive during the said remaining portions, said main discharge device on being rendered conductive discharging said second capacitor between said control electrode and said one principal electrode thereof.

15. In combination, a main electric discharge device having a plurality of principal electrodes and a control electrode, a periodic source of electrical potential, connections for impressing a potential between the principal electrodes of said discharge device, a capacitor, means for charging said capacitor during a portion of each period of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining portions of each of the periods of said source thereby to render said main discharge device conductive said main discharge device on being rendered conductive discharging said capacitor between said control electrode and said one principal electrode thereof, and means for rendering said main discharge device non-conductive a short time compared to a period of said source, after it has been rendered conductive, the last said means including a second auxiliary discharge device and means responsive to current conducted by said main discharge device for rendering said second auxiliary discharge device conductive.

16. In combination, a main electric discharge device having a plurality of principal electrodes and a control electrode, a source of alternating potential, connections for impressing a potential between the principal electrodes of said discharge device, a capacitor, means for charging said capacitor during alternate half periods of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining half periods of said source thereby to render said main discharge device conductive said main discharge device on being rendered conductive discharging said capacitor between said control electrode and said one principal electrode thereof, and means for rendering said main discharge device non-conductive a short time compared to a period of said source, after it has been rendered conductive.

17. In combination, a main electric discharge device having a plurality of principal electrodes and a control electrode, a source of alternating potential, connections for impressing a potential between the principal electrodes of said discharge device, a capacitor, means for charging said capacitor during alternate half periods of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining half periods and at the instants in said half periods at which the magnitude of the potential of said source is substantially a maximum thereby to render said main discharge device conductive said main discharge device on being rendered conductive discharging said capacitor between said control electrode and said one principal electrode thereof, and means for rendering said main discharge device non-conductive a short time compared to a period of said source, after it has been rendered conductive, the last said means including a second auxiliary discharge device and means for rendering said second auxiliary discharge device conductive a predetermined time substantially equivalent to said short time after said main discharge device has been rendered conductive.

18. In combination, a main electric discharge device having a plurality of principal electrodes one of which is of the mercury pool type and a control electrode of the immersion type, a source of alternating potential, connections for impressing a potential between the principal electrodes of said discharge device, a capacitor, means for charging said capacitor during alternate half periods of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining half periods and at the instants in said half periods that correspond to points in the corresponding half cycles which precede the point of maximum magnitude by an angle of the order of from 5 to 10 electrical degrees thereby to render said main discharge device conductive and means for rendering said main discharge device non-conductive a short time compared to a period of said source, after it has been rendered conductive, the last said means including a second auxiliary discharge device having an electrode of the mercury pool type and means for rendering said second auxiliary discharge device conductive a predetermined time substantially equivalent to said short time after said main discharge device has become conductive.

19. In combination, a main electric discharge device having a plurality of principal electrodes one of which is of the mercury pool type and a control electrode of the immersion type, a source of alternating potential, connections for impressing a potential between the principal electrodes of said discharge device, a capacitor, means for charging said capacitor during alternate half periods of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining half periods and at the instants in said half periods that correspond to points in the corresponding half cycles which precede the point of maximum magnitude by an angle of the order of from 5 to 10 electrical degrees thereby to render said main discharge device conductive and means for rendering said main discharge device non-conductive a short time compared to a period of said source, after it has been rendered conductive, the last said means including a second auxiliary discharge device having an electrode of the mercury pool type and means for rendering said second auxiliary discharge device conductive a predetermined time substantially equivalent to said short time after said main discharge device has become conductive.

20. In combination, a main electric discharge device having a plurality of principal electrodes one of which is of the mercury pool type and a control electrode of the immersion type, a source of alternating potential, connections including impedance means for impressing a potential between the principal electrodes of said discharge device, a capacitor, means for charging said capacitor during alternate half periods of said source, an auxiliary discharge device having principal electrodes, means for connecting said capacitor between the control electrode and a principal electrode of said main discharge device through the principal electrodes of said auxiliary discharge device, means for rendering said auxiliary discharge device conductive during the remaining half periods and at the instants in said half periods that correspond to points in the corresponding half cycles which precede the point of maximum magnitude by an angle of the order of from 5 to 10 electrical degrees thereby to render said main discharge device conductive and means for rendering said main discharge device non-conductive a short time compared to a period of said source, after it has been rendered conductive, the last said means including a second auxiliary discharge device having an electrode of the mercury pool type, means for connecting said second auxiliary device in parallel with the network including said main discharge device and said impedance means, and means for rendering said second auxiliary discharge device conductive a predetermined time, substantially equivalent to said short time, after said main discharge device has become conductive.

DAYTON ULREY.